United States Patent [19]
Nakagawa et al.

[11] Patent Number: 5,740,088
[45] Date of Patent: Apr. 14, 1998

[54] CONTROL SIGNAL GENERATING DEVICE GENERATING VARIOUS CONTROL SIGNALS USING STORAGE UNIT HAVING SMALL STORAGE CAPACITY

[75] Inventors: Shinichi Nakagawa; Kiyofumi Kawamoto; Kazuya Ishihara; Satoshi Kumaki; Atsuo Hanami, all of Hyogo, Japan

[73] Assignees: Mitsubishi Denki Kabushiki Kaisha; Mitsubishi Electric Engineering Co., Ltd., both of Tokyo, Japan

[21] Appl. No.: 530,497

[22] Filed: Sep. 19, 1995

[30] Foreign Application Priority Data

Oct. 25, 1994 [JP] Japan ..................... 6-260297

[51] Int. Cl.$^6$ ........................................... G06F 1/02
[52] U.S. Cl. ................. 364/717; 326/46; 326/93; 327/241; 331/78
[58] Field of Search ..................... 364/717, 717.5; 326/21, 46, 93, 105; 327/152, 241; 365/189.01, 189.05, 194, 195; 395/182.06, 183.21, 286; 371/27; 380/46; 331/78

[56] References Cited

U.S. PATENT DOCUMENTS

| | | | |
|---|---|---|---|
| 4,758,738 | 7/1988 | Yamanoi et al. | 327/152 |
| 4,953,128 | 8/1990 | Kawai et al. | 365/194 |
| 5,040,234 | 8/1991 | Yamamoto et al. | 388/811 |
| 5,325,201 | 6/1994 | Herz | 348/571 |
| 5,379,410 | 1/1995 | Okada | 395/182.06 |
| 5,570,307 | 10/1996 | Takahashi | 364/717 |

OTHER PUBLICATIONS

Glasser et al. "The Design and Analysis of VLSI Circuits", 1985, pp. 425–435.

*Primary Examiner*—Reba I. Elmore
*Assistant Examiner*—Emmanuel L. Moise
*Attorney, Agent, or Firm*—Lowe, Price, LeBlanc & Becker

[57] ABSTRACT

A first pseudo random number generating circuit sequentially provides an output signal to a matching detecting circuit in response to a clock signal. A second pseudo random number generating circuit generates an initial value, and then, sequentially provides an output signal to a storage device in response to an output signal from the matching detecting circuit and the clock signal. Data with the output signal as an address is provided as an output signal from the storage device. When the matching detecting circuit detects matching between the output signals, the matching detecting circuit provides the output signals to the second pseudo random number generating circuit and an AND logic circuit. As described above, when the output signal of the matching detecting circuit is provided, the output signals from the storage device are provided as respective output control signals.

12 Claims, 19 Drawing Sheets

FIG. 3

| CLNo. | 06 ←→ 00 | CLNo. | 06 ←→ 00 | CLNo. | 06 ←→ 00 | CLNo. | 06 ←→ 00 |
|---|---|---|---|---|---|---|---|
| 0 | 0000000 | 32 | 0101011 | 64 | 1001111 | 96 | 0111111 |
| 1 | 0000001 | 33 | 1010111 | 65 | 0011111 | 97 | 1111110 |
| 2 | 0000011 | 34 | 0101111 | 66 | 0111110 | 98 | 1111101 |
| 3 | 0000111 | 35 | 1011110 | 67 | 1111100 | 99 | 1111011 |
| 4 | 0001110 | 36 | 0111101 | 68 | 1111001 | 100 | 1110110 |
| 5 | 0011100 | 37 | 1111010 | 69 | 1110010 | 101 | 1101101 |
| 6 | 0111000 | 38 | 1110100 | 70 | 1100100 | 102 | 1011011 |
| 7 | 1110001 | 39 | 1101001 | 71 | 1001001 | 103 | 0110110 |
| 8 | 1100010 | 40 | 1010010 | 72 | 0010010 | 104 | 1101100 |
| 9 | 1000100 | 41 | 0100100 | 73 | 0100101 | 105 | 1011001 |
| 10 | 0001001 | 42 | 1001000 | 74 | 1001010 | 106 | 0110010 |
| 11 | 0010011 | 43 | 0010000 | 75 | 0010100 | 107 | 1100101 |
| 12 | 0100111 | 44 | 0100001 | 76 | 0101000 | 108 | 1001011 |
| 13 | 1001110 | 45 | 1000011 | 77 | 1010001 | 109 | 0010110 |
| 14 | 0011101 | 46 | 0000110 | 78 | 0100010 | 110 | 0101100 |
| 15 | 0111010 | 47 | 0001100 | 79 | 1000101 | 111 | 1011000 |
| 16 | 1110101 | 48 | 0011000 | 80 | 0001011 | 112 | 0110000 |
| 17 | 1101011 | 49 | 0110001 | 81 | 0010111 | 113 | 1100001 |
| 18 | 1010110 | 50 | 1100011 | 82 | 0101110 | 114 | 1000010 |
| 19 | 0101101 | 51 | 1000110 | 83 | 1011100 | 115 | 0000100 |
| 20 | 1011010 | 52 | 0001101 | 84 | 0111001 | 116 | 0001000 |
| 21 | 0110100 | 53 | 0011010 | 85 | 1110011 | 117 | 0010001 |
| 22 | 1101000 | 54 | 0110101 | 86 | 1100110 | 118 | 0100011 |
| 23 | 1010000 | 55 | 1101010 | 87 | 1001101 | 119 | 1000111 |
| 24 | 0100000 | 56 | 1010100 | 88 | 0011011 | 120 | 0001111 |
| 25 | 1000001 | 57 | 0101001 | 89 | 0110111 | 121 | 0011110 |
| 26 | 0000010 | 58 | 1010011 | 90 | 1101110 | 122 | 0111100 |
| 27 | 0000101 | 59 | 0100110 | 91 | 1011101 | 123 | 1111000 |
| 28 | 0001010 | 60 | 1001100 | 92 | 0111011 | 124 | 1110000 |
| 29 | 0010101 | 61 | 0011001 | 93 | 1110111 | 125 | 1100000 |
| 30 | 0101010 | 62 | 0110011 | 94 | 1101111 | 126 | 1000000 |
| 31 | 1010101 | 63 | 1100111 | 95 | 1011111 | 127 | 0000000 |

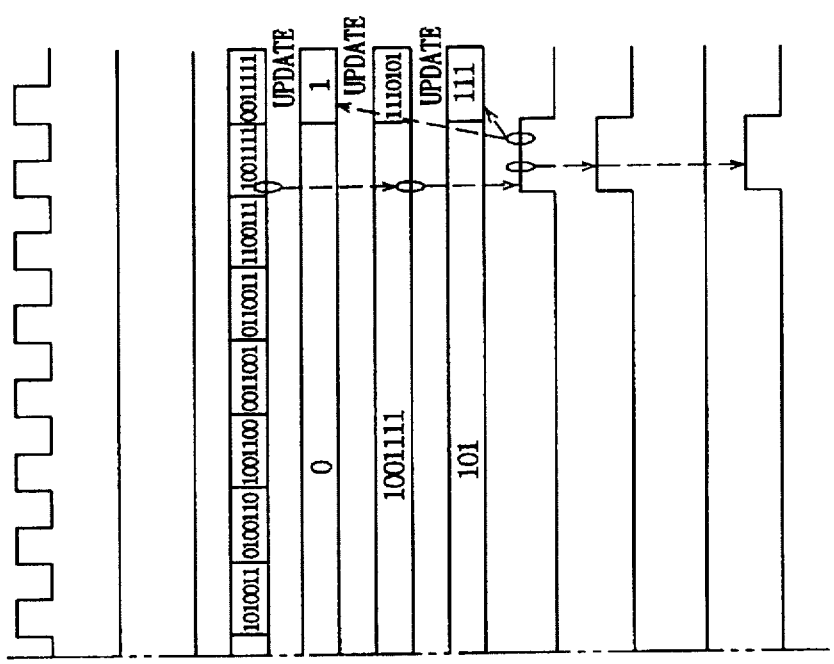
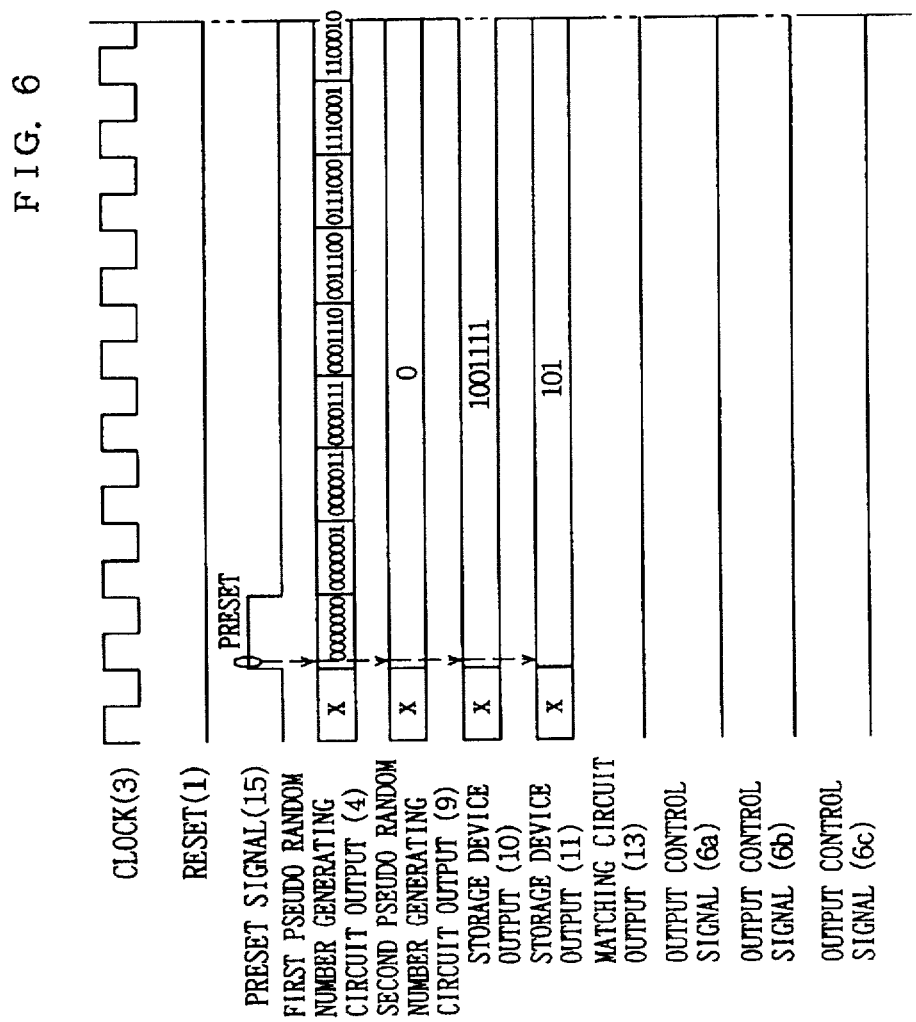
FIG. 6

FIG. 12

| STORAGE DEVICE ADDRESS 9 | STORAGE DEVICE OUTPUT | | |
|---|---|---|---|
| | 24 | 10 | 11 |
| 0000000(0) | 00  xxxxxx | 0000011 | 101 |
| 0000001(1) | 01  0001111 | 0000000 | xxx |
| | | | |
| 0001111(15) | 00  xxxxxx | 0000011 | 101 |
| 0011110(30) | 10  1101110 | 0000000 | xxx |
| | | | |
| 1101110(110) | 00  xxxxxx | 0000111 | 100 |
| 1011101(93) | 00  xxxxxx | 0000011 | 001 |
| 0111011(59) | 11  xxxxxx | 0000000 | xxx |
| | | | |
| 0111100(60) | 00  xxxxxx | 0001111 | 100 |
| | | | |

NUMBERS WITHIN ( ) IN COLUMN OF ADDRESS DENOTE DECIMAL VALUE

# 5,740,088

CONTROL SIGNAL GENERATING DEVICE GENERATING VARIOUS CONTROL SIGNALS USING STORAGE UNIT HAVING SMALL STORAGE CAPACITY

BACKGROUND OF THE INVENTION

1. Field of the Invention

The present invention generally relates to control signal generating devices, and more particularly, to a programmable control signal generating device outputting a control signal to a logic circuit.

2. Description of the Background Art

FIG. 17 is a circuit diagram showing a configuration of a conventional control signal generating device. The control signal generating device counts the number of clocks, and outputs a control signal at a certain particular timing.

In the figure, when an externally applied reset signal 51 is at a "1" level, a binary counter 52 is reset, and output signals 54 all attain a "0" level. Binary counter 52 counts the number of clocks in synchronism with a clock 53, and output signals 54 thereof are represented in binary numeral. When binary counter 52 is a 4-bit counter, for example, the count value is counted up to "0001" upon application of one clock 53 after reset, "0010" upon application of the next clock, and the like.

A logic circuit 55 determines output signals 56 and an output signal 57 based on combination of output signals 54 of binary counter 52. For example, only when an input from binary counter 52 is "0010", logic circuit 55 is designed to set a certain bit of the outputs to the "1" level.

FIG. 18 is a diagram showing a specific example of logic circuit 55 of FIG. 17. FIG. 19 is a timing chart showing operation of the control signal generating device shown in FIGS. 17 and 18.

Referring to the figures, output signal 54a from binary counter 52 is applied to AND logic circuits 103, 105b and 105c, and to AND logic circuits 105a and 105d through an inverter logic circuit 101a. Similarly, output signal 54b of binary counter 52 is applied to AND logic circuits 103 and 105b, and to AND logic circuits 105a 105c and 105d through an inverter 101b. Output signal 54c is applied to AND logic circuits 105a and 105c, and to AND logic circuits 103, 105b and 105d through an inverter 101c. Output signal 54d is applied to an AND logic circuit 105c, and to AND logic circuits 103, 105a and 105b through an inverter 101d. In such a logic circuit structured as described above, output signal 57 from AND logic circuit 103 attains the "1" level only when output signals 54 are "1100". Output signal 57 resets binary counter 52 through an OR logic circuit 58. As described above, logic circuit 55 can reset binary counter 52 at a desired clock count value by providing self-reset. As described above, logic circuit 55 can be formed of logic circuits. However, logic circuit 55 can be formed by using PLAs (Programmable Logic Array), RAMs (Random Access Memory) or the like instead of the logic circuits.

Control signals 56a to 56d attain the "1" level only when output signals 54 of binary counter 52 are "0010", "1000", "1011" and "0000", respectively.

In such a conventional control signal generating device as described above, it is necessary to control logic circuit 55 programmably by using an RAM as logic circuit 55, when it is desired to change the clock count value at which output signals 56 are "1" after building-up of the circuit. More specifically, control circuit 55 is programmably controlled by input of output signals 54 of binary counter 52 to the address input of the RAM. At this time, an RAM having a capacity of m bits×$2^n$ words is required, wherein n represents the number of bits of output signals 54 of binary counter 52, and m represents the number of bits of output signals 56. As n increases, an RAM having a larger capacity is required.

SUMMARY OF THE INVENTION

One object of the present invention is to decrease a storage capacity of a storage unit used in a control signal generating device.

Another object of the present invention is to generate various control signals in a control signal generating device without increasing a storage capacity of a storage unit used.

In order to achieve the above objects, the control signal generating device according to the present invention includes a first numerical data generating unit sequentially generating numerical data in response to a clock signal, a second numerical data generating unit generating an initial value, and then sequentially generating numerical data in response to a first signal and the clock signal, a storage unit in which data corresponding to every numerical data generated by the second numerical data generating unit is stored, a detecting unit detecting matching between at least one part of the corresponding data corresponding to the numerical data generated by the second numerical data generating unit of the stored data and the numerical data generated by the first numerical data generating unit, and a control unit outputting at least another part of the corresponding data in response to a detection output of the detecting unit, and generating the first signal.

In the control signal generating device configured as described above, at least one part of the corresponding data is provided in response to the detection output of the detecting unit, and the first signal is generated. Therefore, the control signal generating device can output an output control signal at a timing according to the data stored in the storage unit. Therefore, the control signal generating device can output various control signals without increasing the storage capacity of the storage unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a graph showing a specific example of a bit pattern corresponding to every input of a clock in the pseudo random number generating circuits of FIG. 2.

FIG. 6 is a timing chart showing operation of respective portions of the control signal generating device of FIG. 5.

FIG. 12 is a diagram showing the content of data stored in a storage device 5 of FIG. 11.

DESCRIPTION OF THE PREFERRED EMBODIMENTS

Figure 1:
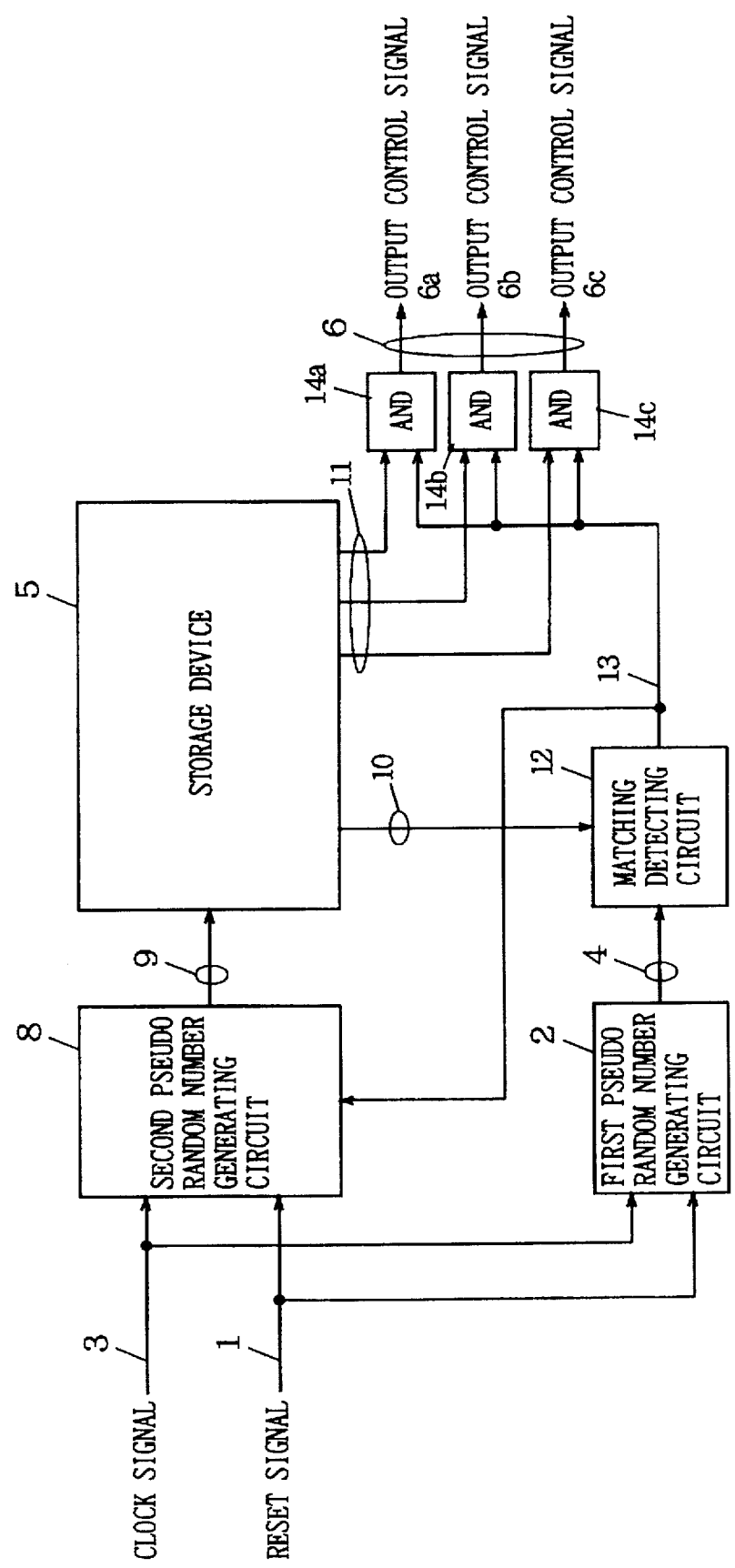
FIG. 1 is a block diagram showing the configuration of a control signal generating device according to a first embodiment of the present invention.

FIG. 1 is a block diagram showing the configuration of the control signal generating device according to the first embodiment of the present invention.

Referring to FIG. 1, the control signal generating device includes first pseudo random number generating circuit 2 and second pseudo random number generating circuit 8 respectively receiving a reset signal 1 and a clock signal 3, storage device 5 capable of holding various data and outputting the data as output signals 10 and 11 using output signals 9 from second pseudo random number generating circuit 8 as their address values, a matching detecting circuit 12 receiving output signals 4 of first pseudo random number generating circuit 2 and output signals 10 of storage device 5 and detecting matching between the signals, and AND logic circuit 14a to 14c receiving output signals 11 from storage device 5 and an output signal 13 of matching detecting circuit 12 and outputting output control signals 6a to 6c, respectively.

Output signal 13 of matching detecting circuit 12 is also applied to second pseudo random number generating circuit 8.

Output signals 10 and 11 are provided from storage device 5, and separately shown for the sake of convenience as two data obtained just by separating output data of the same address into two according to their purposes. More specifically, data of some bits of data of a predetermined number of bits corresponding to individual addresses of storage device 5 corresponds to output signals 10, and data of other bits corresponds to output signals 11.

Figure 2:
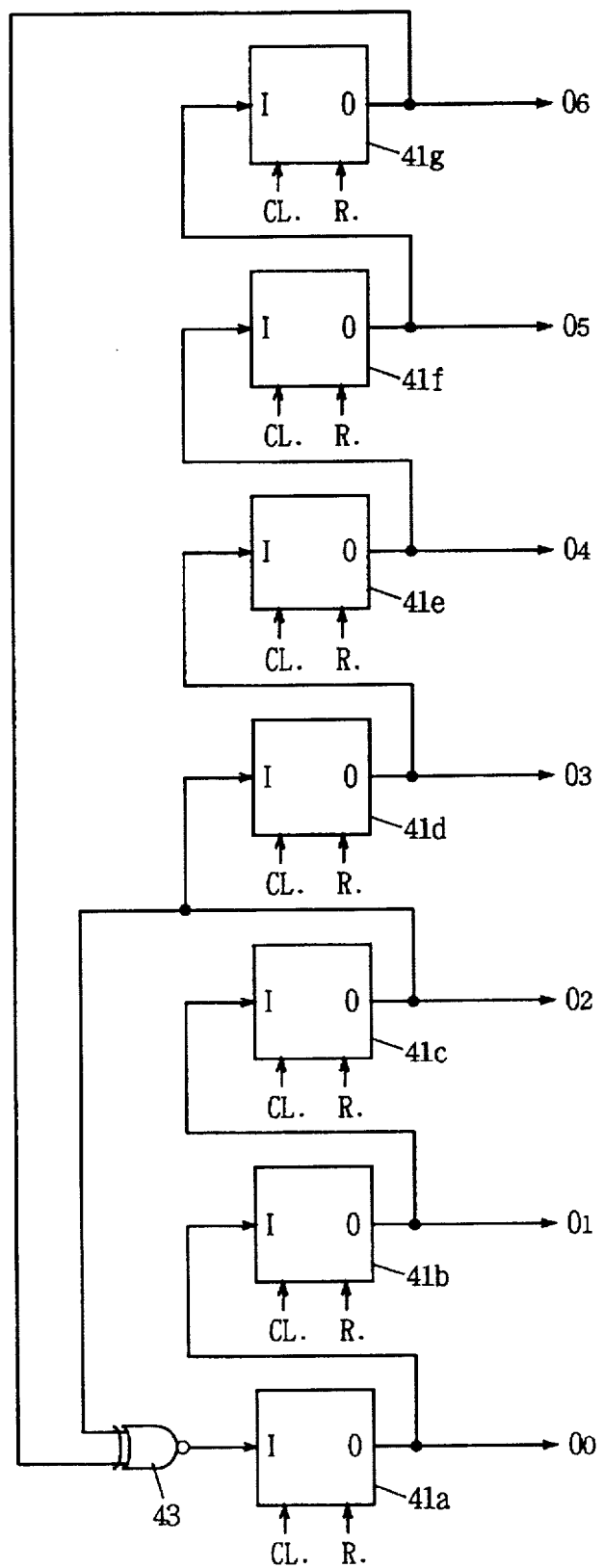
FIG. 2 shows one example of respective configurations of a first pseudo random number generating circuit 2 and a second pseudo random number generating circuit 8 of FIG. 1.

FIG. 2 is a diagram showing a specific example of a pseudo random number generating circuit used in first pseudo random number generating circuit 2 and second pseudo random number generating circuit 8 shown in FIG. 1.

Referring to FIG. 2, the pseudo random number generating circuit includes seven stages of registers 41a to 41g connected in series. An output terminal O of each register is connected to a bit output and an input terminal I of a register at the upper stage. Output terminal O of register 41c is connected not only to the output bit and input terminal I of register 41d at the upper stage, but also to the input of a non-exclusive logical sum circuit 43. Output terminal O of register 41g at the uppermost stage is connected to the output bit and the input of non-exclusive logical sum circuit 43. The output of non-exclusive logical sum circuit 43 is connected to input terminal I of register 41a at the lowermost stage. Note that registers 41a to 41g each receive a clock signal CL and a reset signal R.

FIG. 3 is a diagram showing an output bit pattern of registers 41a to 41g in the pseudo random number generating circuit of FIG. 2, when clock signal CL is sequentially input after reset signal R is applied and the outputs of all the registers attain the "0" level. Upon application of the first clock after reset, for example, the number of clock is "1", and respective outputs $O_6$ to $O_0$ of registers 41g to 41a are "0", "0", "0", "0", "0", "0", and "1". More specifically, the output bit pattern is "0000001". The pseudo random number generating circuit outputs all the bit patterns excluding a bit pattern of "1111111". Converted into decimal notation, the output bit pattern is "0", "1", "3", "7", "14". A pseudo random number is thus generated.

The above description is one example of a 7-bit pseudo random number generating circuit. A 10-bit pseudo random number generating circuit, for example, is implemented by further increasing the number of registers, and applying a non-exclusive logical sum of outputs $O_2$ and $O_9$ to the register at the lowermost stage.

Figure 4:
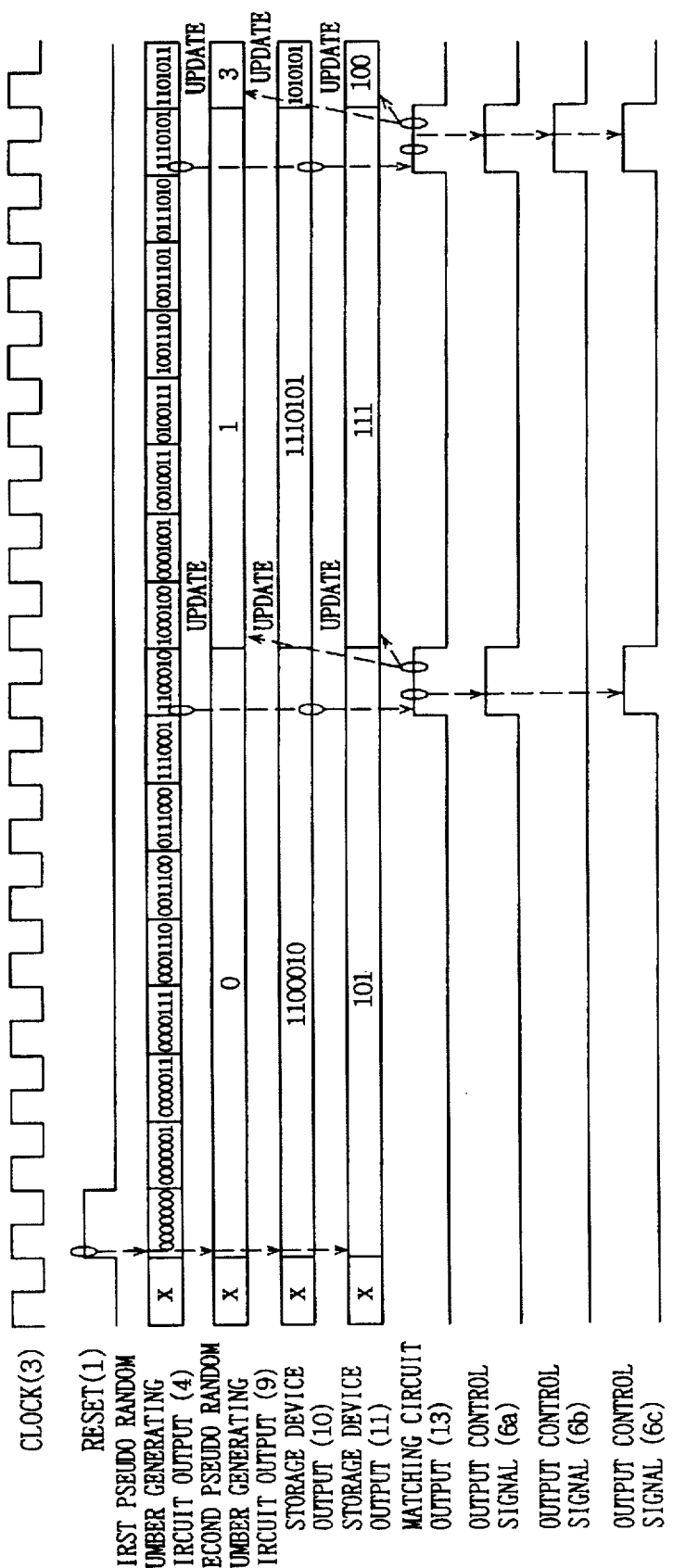
FIG. 4 is a timing chart showing specific operation of respective portions of the control signal generating circuit of FIG. 1.

FIG. 4 is a timing chart showing operation of respective portions of the control signal generating circuit of FIG. 1.

Referring to the figures, operation of the control signal generating device according to the first embodiment will be described.

In the initial state, reset signal 1 is externally applied. At this time, first pseudo random number generating circuit 2 and second pseudo random number generating circuit 8 are reset so that the outputs of the both circuits attain the "0" level. Output signals 9 of second pseudo random number generating circuit 8 are inputs which correspond to address values of storage device 5. Therefore, storage device 5 outputs output signals 10 and 11 corresponding to data corresponding to the 0-th address of storage device 5. Second pseudo random number generating circuit 8 is controlled to cause the next random number value to be output in synchronism with the next clock only when output signal 13 of matching detecting circuit 12 is at the "1" level. Matching detecting circuit 12 outputs a signal of "1", only when output signals 4 of first pseudo random number generating circuit 2 and output signals 10 of storage device 5 take the same value. Similar to a conventional counter, first pseudo random number generating circuit 2 sequentially outputs a random number value in synchronism with the clock.

Assume that output signals 10 of storage device 5 is "1100010" (binary number) immediately after reset. At this time, output signal 13 of matching detecting circuit 12 is "0". Therefore, output control signals 6a to 6c are all at the "0" level irrespective of the value of output signals 11 ("101" in this example) of storage device 5. Upon application of one clock signal, first pseudo random number generating circuit 2 outputs the next random number value "0000001". However, output signals 9 of second pseudo random number generating circuit 8 do not change in this state. Therefore, output signals 10 and 11 of storage device 5 remains data of the 0-th address. Since the output of matching detecting circuit 12 does not attain "1", output control signals 6 all remain at "0".

Upon application of eight clock signals, the output of first pseudo random number generating circuit 2 is "1100010", which is matched with output signals 10 of storage device 5. Therefore, output signal 13 of matching detecting circuit 12 attains "1". At this time, the output control signals are provided according to the binary pattern ("101" in this example) of output signals 11 of storage device 5. More specifically, output control signal 6a is "1", output control signal 6b is "0", and output control signal 6c is "1". Further, second pseudo random number generating circuit 8 outputs the next random number value "1" in response to the next clock, and data of the first address of storage device 5 is provided as output signals 10 and 11 of storage device 5.

If output signals 10 of storage device 5 are "1110101", output signal 13 of matching detecting circuit 12 remains at "0" until output signals 4 of first pseudo random number generating circuit 2 attain "1110101", bringing all the values of output control signals 6 to "0" again. When the output value of first pseudo random number generating circuit 2 attains "1110101", the binary pattern ("111" in this example) according to data of the first address (output signals 11) of storage device 5 is provided as output control signals 6.

After that, output control signals are sequentially provided at timings according to data patterns (output signals 10 and 11 of storage device 5) stored at addresses of random number values (3, 7, 14 . . . ) output from second pseudo random number generating circuit 8.

In the conventional control signal generating device, a storage device having an address space of $2^n$ was required in order to control a clock cycle period of $2^n$ programmably. However, according to the present invention, data in the clock cycle period when all the control signals may be "0" is not required, thereby reducing the address space of the storage device. Further, by using a pseudo random number generating circuit, the amount of circuitry can be reduced as compared to the case of an ordinary increment type counter (pointer).

Figure 5:
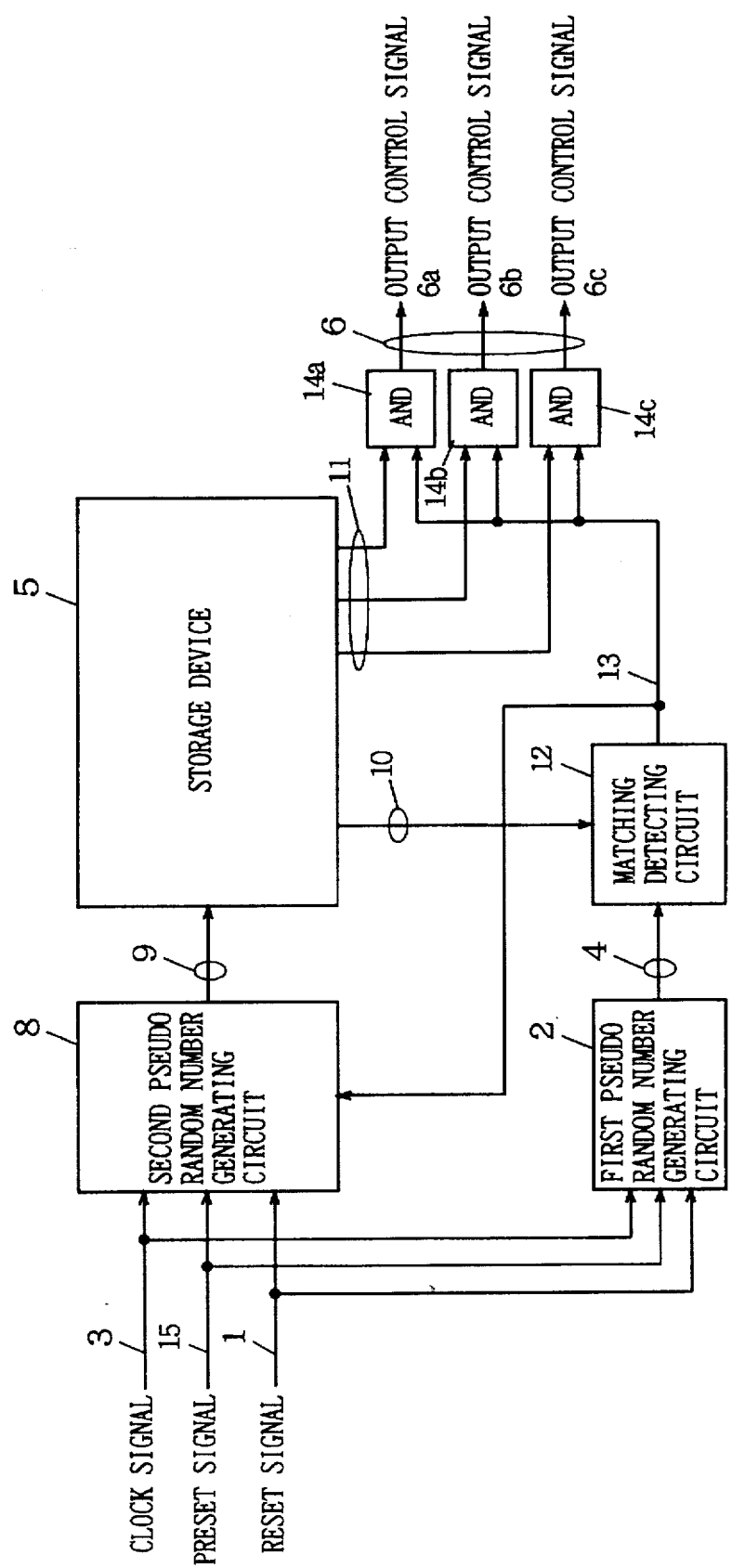
FIG. 5 is a block diagram showing the specific configuration of a control signal generating device according to a second embodiment of the present invention.

FIG. 5 is a block diagram showing the configuration of a control signal generating device according to the second embodiment of the present invention.

Referring to the figure, the difference in configuration between the device according to the first embodiment of FIG. 1 and the device according to the second embodiment will be primarily described. In this embodiment, a preset signal 15 is input to first pseudo random number generating circuit 2 and second pseudo random number generating circuit 8. Other than that, the device of this embodiment is similar in configuration to the device of the first embodiment.

FIG. 6 is a timing chart showing operation of respective portions of the control signal generating device of FIG. 5.

Referring to the figures, operation of the control signal generating device according to the second embodiment will be described.

First, in the initial state, reset signal 1 or preset signal 15 is externally applied. Since operation upon application of reset signal 1 is similar to that of the first embodiment, the description thereof will not be repeated. In the case of application of preset signal 15, output signals 9 of second pseudo random number generating circuit 8 are set to a preset value ("0000000" in this embodiment ("0" in decimal notation)), and output signals 4 of first pseudo random number generating circuit 2 are also set to the preset value of "0000000". The preset value may be set to an arbitrary value only by the preset signal, or by setting signals formed of a plurality of bits to arbitrary values.

Similar to the case of the first embodiment, output signals 9 of second pseudo random number generating circuit 8 are data showing the address value of storage device 5. Storage device 5 provides output signals 10 and 11 corresponding to data of the address set by the preset signal. Second pseudo random number generating circuit 8 is controlled so that it outputs the next random number value in synchronism with the next clock only when output signal 13 of matching detecting circuit 12 is "1". On the other hand, first pseudo random number generating circuit 2 sequentially outputs random number values in synchronism with clocks. Matching detecting circuit 12 outputs "1" only when output signals 4 of first pseudo random number generating circuit 2 and output signals 10 of storage device 5 take the same value.

Assume that output signals 10 of storage device 5 are "1001111", and output signals 4 of first pseudo random number generating circuit 2 are "0000000" in the state immediately after preset. Since output signal 13 of matching detecting circuit 12 is "0" at this time, output control signals 6a to 6c are all "0" irrespective of the value ("101" in this embodiment) of output signals 11 of storage device 5.

Similar to the case of the first embodiment, output control signals 6 all remain at the "0" level until output signals 10 of storage device 5 is matched with output signals 4 of first pseudo random number generating circuit 2.

Upon application of the 64th clock signal, output signals 4 of first pseudo random number generating circuit 2 attain "1001111", and is matched with output signals 10 of storage device 5. Therefore, output signal 13 of matching detecting circuit 12 attains the "1" level. At this time, output control signals 6 are provided according to a binary pattern ("101" in this embodiment) of output signals 11 of storage device 5. More specifically, output control signal 6a is provided at the "1" level, output control signal 6b is provided at the "0" level, and output control signal 6c is provided at the "1" level. In response to the next clock, second pseudo random number generating circuit 8 outputs the next random number value ("0000001" in this embodiment ("1" in decimal notation)), and updates the read address of storage device 5. Data of the updated first address is output as output signals 10 and 11 of storage device 5.

Similar to the case of the first embodiment, output control signals 6a to 6c are provided at timings according to the stored data patterns (output signals 10 and 11 of storage device 5).

In the first embodiment, it was not possible to control different clock cycle periods. However, in the second embodiment, by setting various preset values, a plurality of timings are prepared, and timings at which control signals are generated can be switched depending on a purpose of control.

Figure 7:
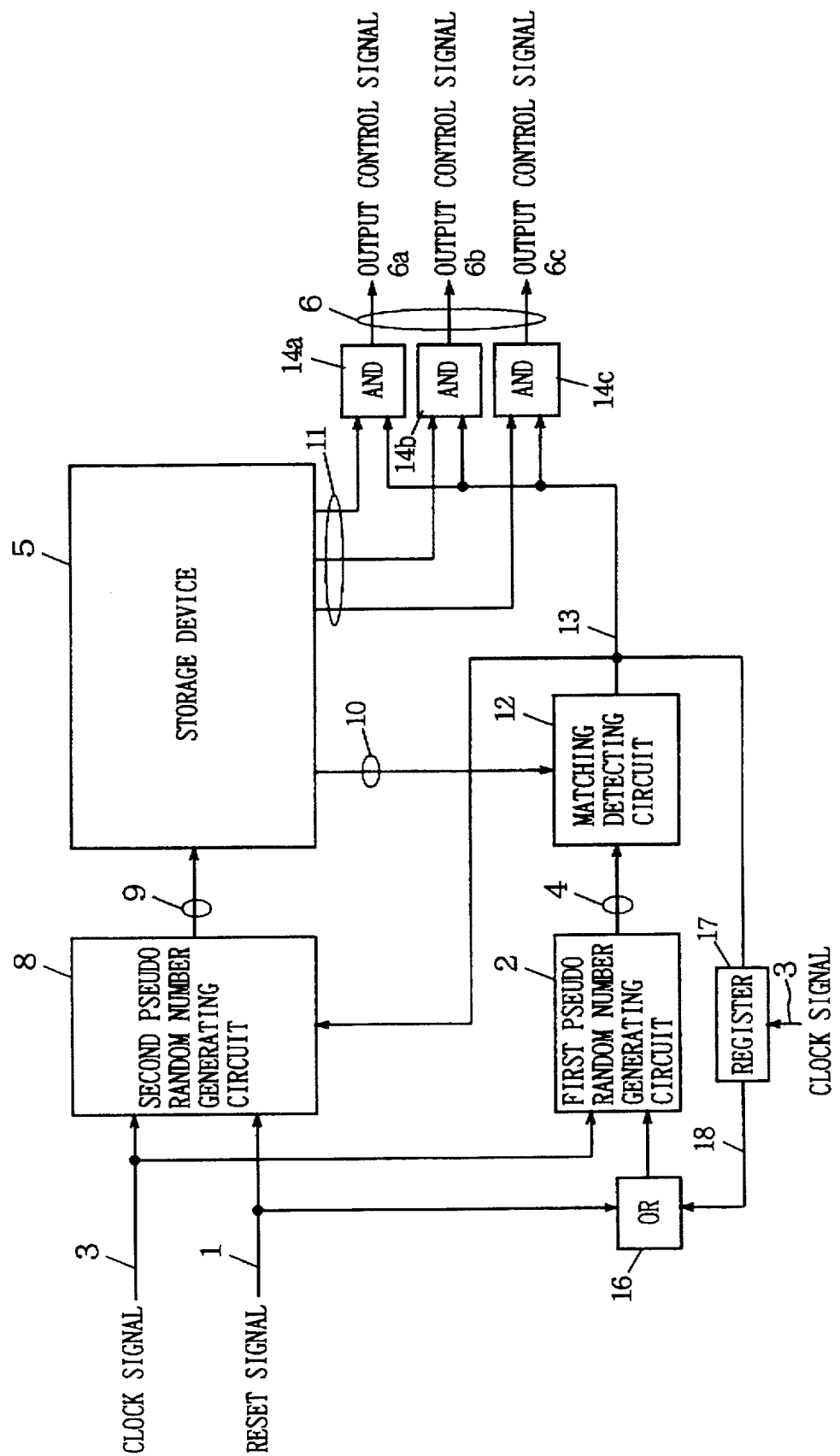
FIG. 7 is a block diagram showing the specific configuration of a control signal generating device according to a third embodiment of the present invention.

FIG. 7 is a block diagram showing the configuration of the control signal generating device according to the third embodiment of the present invention.

Referring to the figure, the difference in configuration between the first embodiment of FIG. 1 and the third embodiment will be primarily described. The control signal generating device according to this embodiment includes a register 17 receiving output signal 13 of matching detecting circuit 12 and an OR logic circuit 16 receiving an output signal 18 of register 17 and reset signal 1 and providing its output to first pseudo random number generating circuit 2 in addition to the components of the control signal generating device of the first embodiment. Other than that, the control signal generating device according to the third embodiment is similar to that of the first embodiment.

Figure 8:
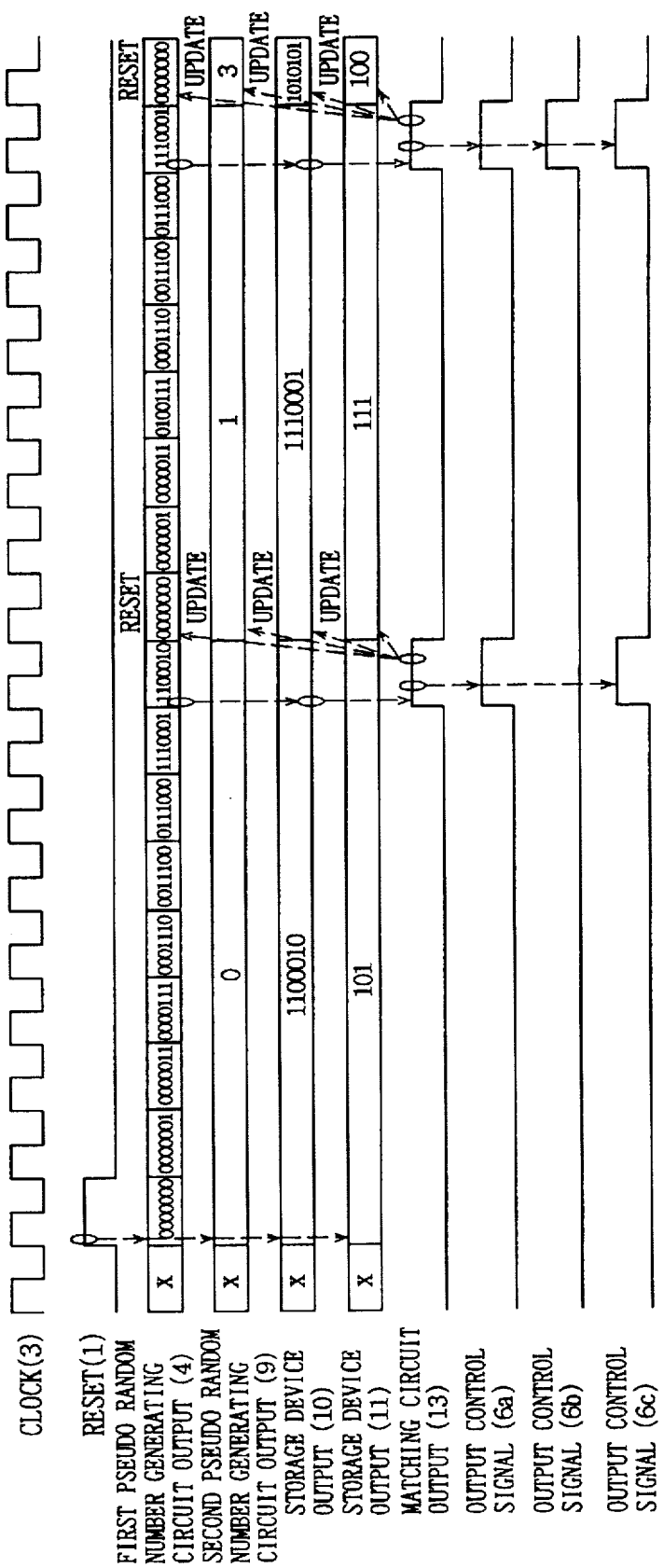
FIG. 8 is a timing chart showing operation of respective portions of the control signal generating device of FIG. 7.

FIG. 8 is a timing chart showing operation of respective portions of the control signal generating device of FIG. 7.

Referring to the figures, operation of the control signal generating device of FIG. 7 will be described.

First, reset signal 1 is externally applied in the initial state. After application of reset signal 1, the device carries out operation similar to that of the first embodiment until output signal 13 of matching detecting circuit 12 attains "1" for the first time.

When output signal 13 of matching detecting circuit 12 attains "1" for the first time (when output signals 4 of first pseudo random number generating circuit 2 attain "1100010" in this embodiment), output control signals 6a to 6c are first provided according to the binary pattern of output signals 11 of storage device 5. Simultaneously, output signal 13 of matching detecting circuit 12 is held by register 17.

In response to the next clock signal 3, second pseudo random number generating circuit 8 outputs the next random number value ("1" in decimal notation), and updates the read address of storage device 5. Data of the updated address is provided as output signals 10 and 11 of storage device 5. Simultaneously, output signal 18 of register 17 to which clock signal 3 is applied is input to first pseudo random number generating circuit 2 through OR logic circuit 16, to set all output signals 4 to "0". Data ("1100010" in this embodiment) represented by output signals 10 of storage device 5 is data indicating how many clocks (eight clocks) should be applied from the output timing of output signals 10 of storage device 5 of the immediately previous address before output signals 10 are matched with output signals 4. Therefore, unlike the first and second embodiments in which data represented by output signals 10 is the absolute number of clocks, data represented by output signals 10 is the relative number of clocks in the third embodiment.

By similar operation to that after the reset state, arbitrary output control signals can be obtained. In the first and second embodiments, output bits (only with respect to output signals 10) of first pseudo random number generating circuit 2 and storage device 5 for counting at least the number of the total clock cycles were required. However, in this embodiment, first pseudo random number generating circuit 2 is reset for every output signal 13 of matching detecting circuit 12, thereby reducing the number of output bits of first pseudo random number generating circuit 2 and storage device 5.

Figure 9:
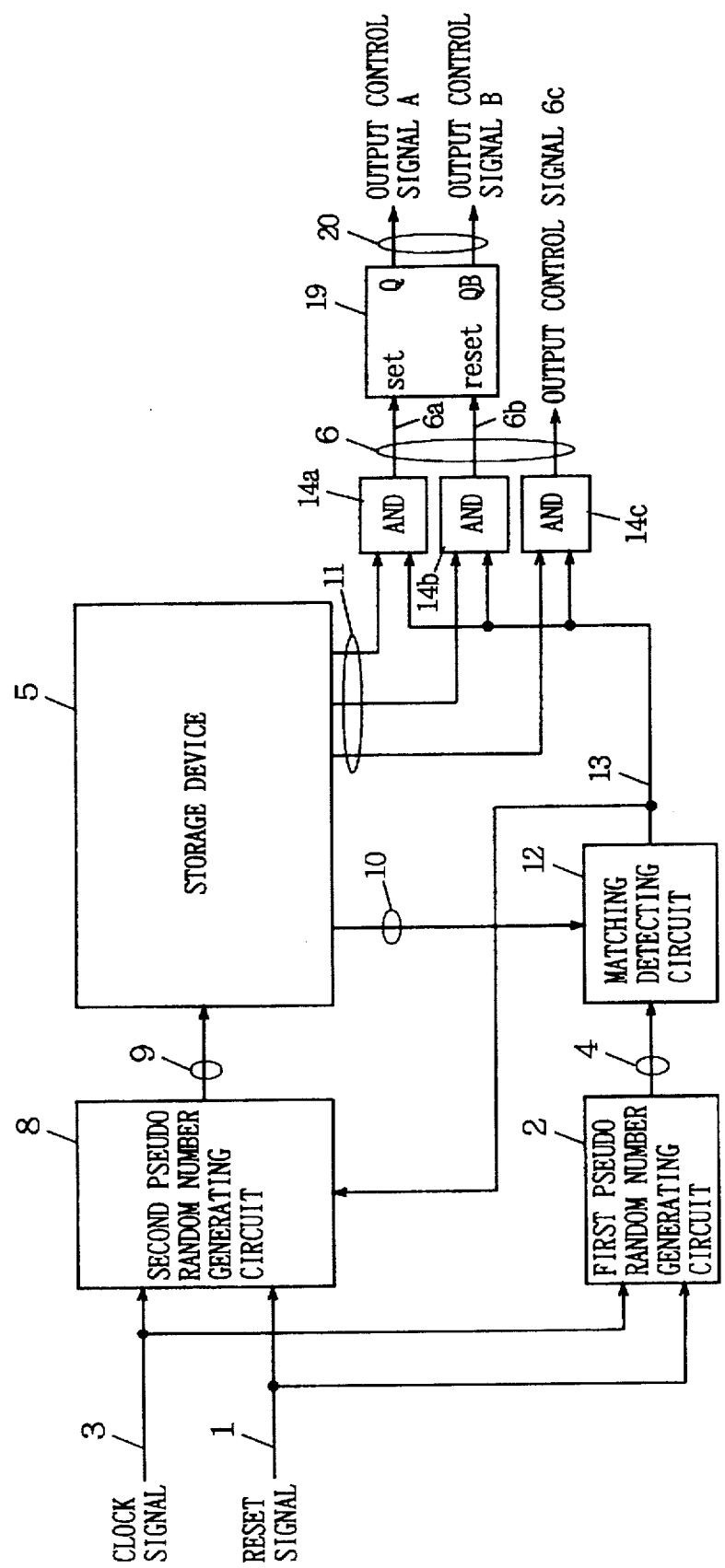
FIG. 9 is a block diagram showing the specific configuration of a control signal generating device according to a fourth embodiment of the present invention.

FIG. 9 is a block diagram showing the configuration of the control signal generating device according to the fourth embodiment of the present invention.

Referring to the figure, the difference in configuration between the first embodiment of FIG. 1 and this embodiment will be primarily described. In this embodiment, an RS flip-flop circuit 19 receiving respective output signals from AND logic circuits 14a and 14b is further provided, and output signals 20 are provided as output control signals A and B. Other than that, this embodiment is similar to the first embodiment.

Figure 10:
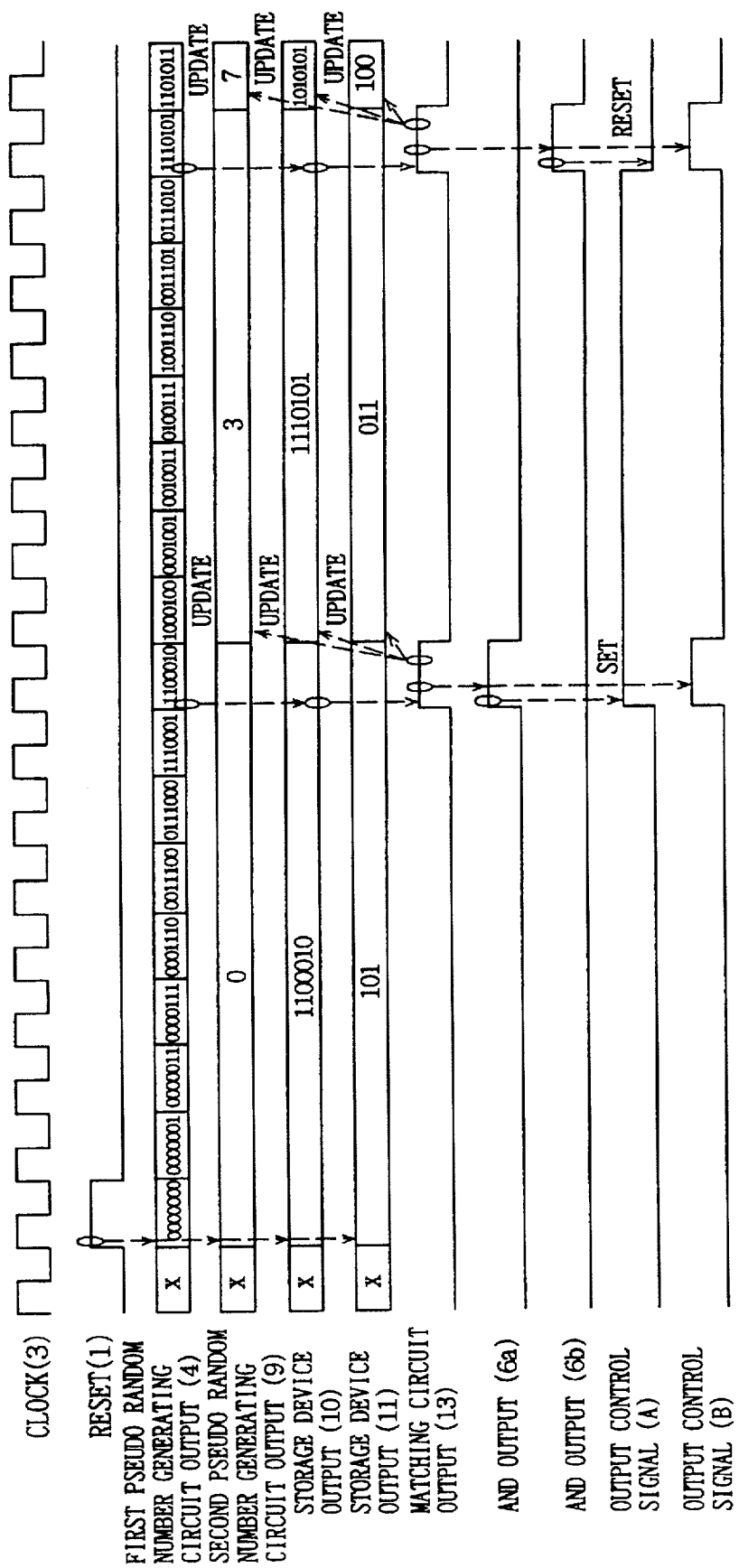
FIG. 10 is a timing chart showing operation of respective portions of the control signal generating device of FIG. 9.

FIG. 10 is a timing chart showing operation of respective portions of the control signal generating device of FIG. 9.

Referring to the figures, operation of the control signal generating device according to the fourth embodiment will be described.

This embodiment is based on the first embodiment, and operation similar to that of the first embodiment is carried out. However, the final output control signals 20 are provided differently.

Data of storage device 5 is prepared so that, when output signals 10 of storage device 5 are matched with output signals 4 of first pseudo random number generating circuit 2 for the first time, output control signal 6a enters the set terminal of RS flip-flop circuit 19 as "1", and that, when output signals 10 of storage device 5 are matched with output signals 4 of first pseudo random number generating circuit 2 at the next time, output control signal 6b enters the reset terminal of RS flip-flop circuit 19 as "1". As a result, an arbitrary signal of output control signals 6a and 6b can be input to the set terminal and the reset terminal of RS flip-flop circuit 19, and the final output control signals 20 can be set to "1" and "0" at an arbitrary timing.

When it is intended to set a certain output control signal to "1" for 10 clock cycle periods, a 10-word address space of storage device 5 is required in the first to the third embodiments. However, in the fourth embodiment, output signals 11 may be provided only at timings at which RS flip-flop circuit 19 is set and reset. Therefore, a two-word address space is required, making it possible to reduce the address space of storage device 5.

Figure 11:
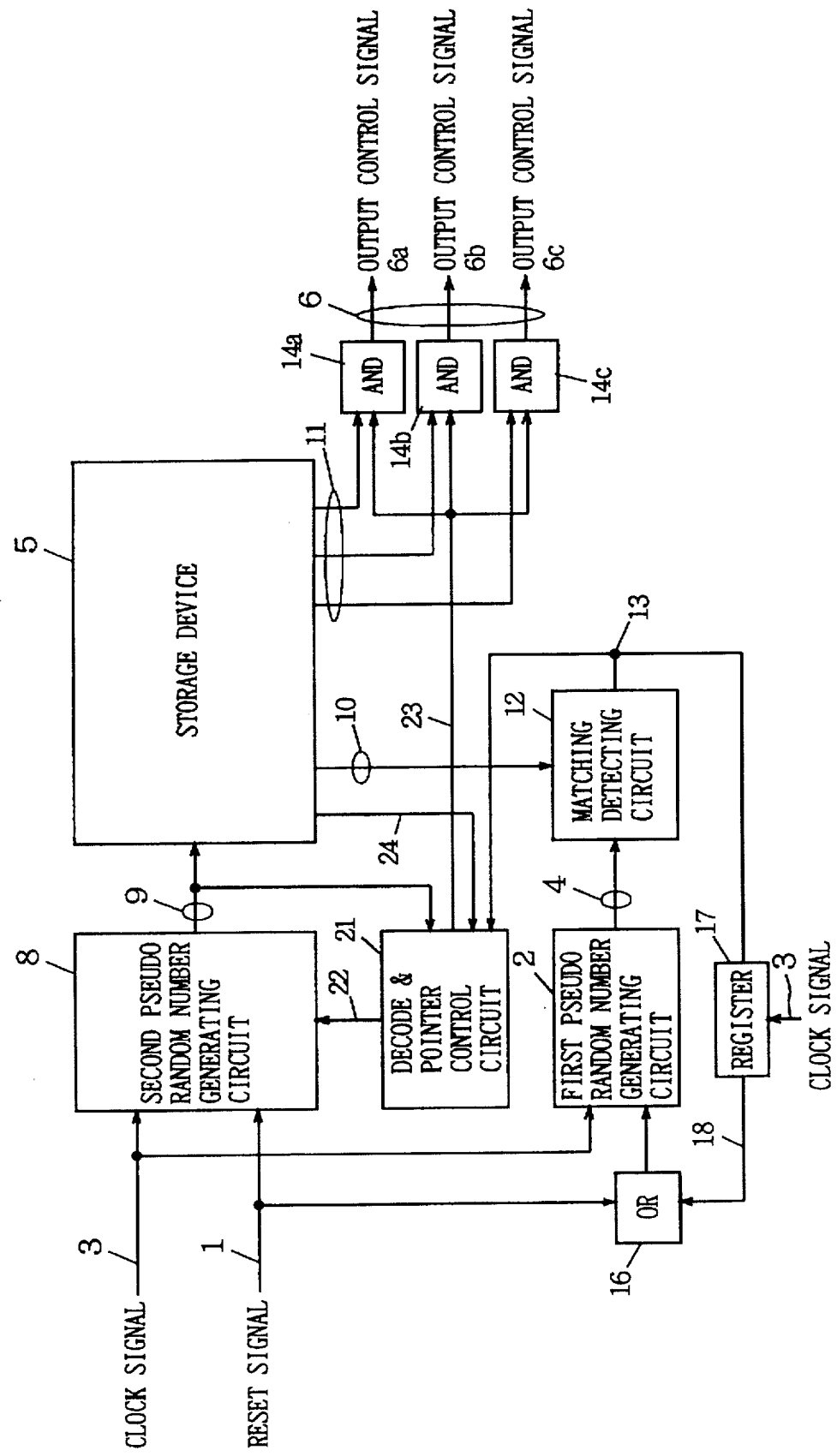
FIG. 11 is a block diagram showing the specific configuration of a control signal generating device according to a fifth embodiment of the present invention.

FIG. 11 is a block diagram showing the configuration of the control signal generating device according to the fifth embodiment of the present invention.

Referring to the figure, the difference in configuration between the third embodiment of FIG. 7 and this embodiment will be primarily described. In this embodiment, a decode and pointer control circuit 21 for controlling second pseudo random number generating circuit 8 is further provided. Decode and pointer control circuit (logic circuit) 21 receives output signals 9 of second pseudo random number generating circuit 8, output signal 13 of matching detecting circuit 12, and a newly added output signal 24 of storage device 5. Unlike the case of the third embodiment, output signal 13 of matching detecting circuit 12 is not provided to AND logic circuits 14a to 14c.

As described above, logic circuit 21 receives as inputs output signals 9 of second pseudo random number generating circuit 8, output signal 24 of storage device 5, and output signal 13 of matching detecting circuit 12, outputs a value predetermined by combination of respective input signals as a signal 23 to AND logic circuits 14a to 14c, and further controls a value of output signals 9 of second pseudo random number generating circuit 8 in response to the next clock. Logic circuit 21 decodes the content of output signal 24 of storage device 5, and makes control of second pseudo random number generating circuit 8 corresponding to a predetermined binary bit pattern.

Output signal 23 to AND logic circuits 14a to 14c and an output signal 22 to second pseudo random number generating circuit 8 corresponding to combination of respective inputs are controlled as follows, for example.

When output signal 13 of matching detecting circuit 12 is at the "0" level, logic circuit 21 sets output signal 23 to "0" irrespective of the other inputs. Logic circuit 21 provides output signal 22 so as to hold output signals 9 of second pseudo random number generating circuit 8 at the current random number value in response to the next clock.

When output signal 13 of matching detecting circuit 12 is at the "1" level, and output signal 24 of storage device 5 is "00 xxxxxxx", logic circuit 21 sets output signal 23 to "1". Logic circuit 21 provides output signal 22 so as to set output signals 9 of second pseudo random number generating circuit 8 to the next random number value in response to the next clock.

When output signal 13 of matching detecting circuit 12 is at the "1" level, and output signal 24 of storage device 5 is "01 xxxxxxx", logic circuit 21 sets output signal 23 to "0". Logic circuit 21 provides output signal 22 so as to set output signals 9 of second pseudo random number generating circuit 8 to "xxxxxxx" in response to the next clock.

When output signal 13 of matching detecting circuit 12 is at the "1" level, and output signal 24 of storage device 5 is "10 xxxxxxx", logic circuit 21 sets output signal 23 to "0", and holds "the next random number value" of "the current pseudo random number value" currently indicated by output signals 9 of second pseudo random number generating circuit 8 in a register provided in logic circuit 21. Logic circuit 21 provides output signal 22 so as to set output signals 9 of second pseudo random number generating circuit 8 to "xxxxxxx" in response to the next clock.

When output signal 13 of matching detecting circuit 12 is at the "1" level, and output signal 24 of storage device 5 is "11 xxxxxxx", logic circuit 21 sets output signal 23 to "0", and provides output signal 22 so as to set output signals 9 of second pseudo random number generating circuit 8 to the value held by the register provided in logic circuit 21 in response to the next clock.

Note that the space in the bit pattern is only provided conveniently. There is no data here actually. In the bit pattern, "x" indicates that the data may be "1" or "0".

As described above, decode and pointer control circuit 21 is used which defines output signal 24 of storage device 5, and which can operate as described above as a logic circuit.

FIG. 12 is a timing chart showing operation of respective portions of the control signal generating device of FIG. 11.

Referring to the figures, operation of the control signal generating device according to the fifth embodiment will be described.

Figure 13:
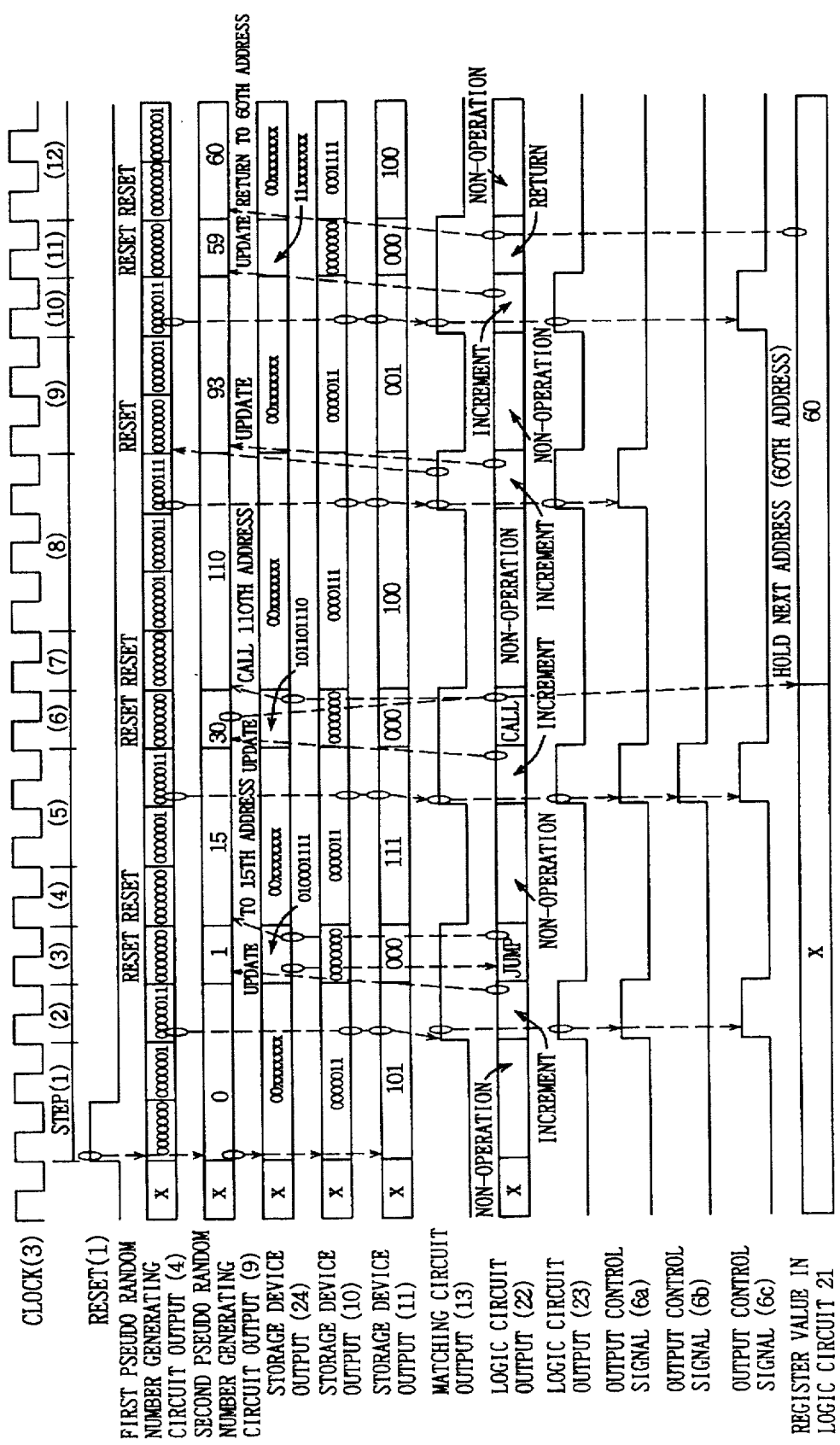
FIG. 13 is a timing chart showing operation of respective portions of the control signal generating device of FIG. 11.

In the following description, the case where the content of storage device 5 is the content of FIG. 12 is taken as an example. For simplification of the description, output signals 9 of second pseudo random number generating circuit 8 serving as the address values of storage device 5 are described in the calling order in FIG. 12. In the following description, operation is divided into steps (1) to (12). Respective step numbers (1) to (12) are written under clocks in the timing chart of FIG. 13 correspondingly.

Step (1)

Output signal 13 of matching detecting circuit 12 remains at "0" until output signals 10 of storage device 5 are matched with output signals 4 of first pseudo random number generating circuit 2 after reset. Therefore, first pseudo random number generating circuit 2 outputs the next random number sequentially. In the meantime, output control signals 6a to 6c all remain at "0".

Step (2)

When output signals 4 of first pseudo random number generating circuit 2 attain "0000011", output signals 10 of storage device 5 are matched with output signals 4 of first pseudo random number generating circuit 2, and output signal 13 of matching detecting circuit 12 attains "1". Output signal 13 is held by register 17.

Since the first bits of the bit pattern of output signal 24 of storage device 5 are "00", logic circuit 21 sets output signal 23 to "1". Output signal 23 of logic circuit 21 is ANDed with the bit pattern ("101" in this embodiment) of output signals 11 of storage device 5, and provided as output control signals 6. Further, logic circuit 21 controls output signals 9 of second pseudo random number generating circuit 8 to attain the next random number value "0000001" (first address) in response to the next clock.

Step (3)

Since the value held in register 17 is "1" at the next clock, first pseudo random number generating circuit 2 is reset, and output signals 4 attain "0000000". Further, data of the first address is provided as output of storage device 5.

Since both output signals 10 of storage device 5 and output signals 4 of first pseudo random number generating circuit 2 are "0000000" at this time, output signal 13 of matching detecting circuit 12 attains "1" This output signal 13 is held in register 17.

Since the first bits of the bit pattern of output signal 24 of storage device 5 are "01", logic circuit 21 sets output signal 23 to "0". Since output signal 23 of logic circuit 21 is "0", output control signals 6a to 6c are all provided as "0".

Further, since the bit pattern of output signal 24 of storage device 5 is "01 0001111", logic circuit 21 controls output signals 9 of second pseudo random number generating circuit 8 to attain "0001111" (fifteenth address) in response to the next clock.

Step (4)

Since the value held in register 17 is "1" at the next clock, first pseudo random number generating circuit 2 is reset, and output signals 4 attain "0000000". Data of the fifteenth address is provided as output of storage device 5.

Since the first bits of the bit pattern of output signal 24 of storage device 5 are "00", output signal 13 of matching detecting circuit 12 remains at "0" until output signals 10 of storage device 5 are matched with output signals 4 of first pseudo random number generating circuit 2. In synchronism with the clock, first pseudo random number generating circuit 2 sequentially outputs the next random number value. In the meantime, output control signals 6a to 6c all remain at "0".

Step (5)

When output signals 4 of first pseudo random number generating circuit 2 attain "0000011", output signals 10 of storage device 5 are matched with output signals 4 of first pseudo random number generating circuit 2, and output signal 13 of matching detecting circuit 12 attains "1". Output signal 13 is held in register 17.

Since the first bits of the bit pattern of output signal 24 of storage device 5 are "00", logic circuit 21 sets output signal 23 to "1". Output signal 23 of logic circuit 21 is ANDed with the bit pattern ("111" in this embodiment) of output signals 11 of storage device 5, and provided as output control signals 6. Further, logic circuit 21 controls output signals 9 of second pseudo random number generating circuit 8 to attain the next random number value "00111" (thirtieth address) in response to the next clock.

Step (6)

Since the value held in register 17 is "1" at the next clock, first pseudo random number generating circuit 2 is reset, and output signals 4 attain "0000000". Data of the thirtieth address is provided as output of storage device 5.

Since both output signals 10 of storage device 5 and output signals 4 of first pseudo random number generating circuit 2 are "0000000" at this time, output signal 13 of matching detecting circuit 12 attains "1". Output signal 13 is held in register 17.

Since the first bits of the bit pattern of output signal 24 of storage device 5 are "10", logic circuit 21 sets output signal 23 to "0".

Since output signal 23 of logic circuit 21 is "0", output control signals 6a to 6c are all provided as "0". Further, since the bit pattern of output signal 24 of storage device 5 is "10 1101110", logic circuit 21 holds output signals 9 (=0011110=next random number value of the thirtieth address (=0111100=sixtieth address)) of second pseudo random number generating circuit 8 in a register provided internally. Logic circuit 21 controls output signals 9 of second pseudo random number generating circuit 8 to attain "1101110" (one hundred and tenth address) in response to the next clock.

Step (7)

Since the value held in register 17 is "1" at the next clock, first pseudo random number generating circuit 2 is reset, and output signals 4 attain "0000000". Data of the one hundred and tenth address is provided as output of storage device 5.

Since the first bits of the bit pattern of output signal 24 of storage device 5 are "00", output signal 13 of matching detecting circuit 12 remains at "0" until output signals 10 of storage device 5 are matched with output signals 4 of first pseudo random number generating circuit 2. First pseudo random number generating circuit 2 sequentially outputs the next random number value in synchronism with the clock. In the meantime, output control signals 6a to 6c all remain at "0".

Step (8)

When output signals 4 of first pseudo random number generating circuit 2 attain "0000111", output signals 10 of storage device 5 are matched with output signals 4 of first pseudo random number generating circuit 2, and output signal 13 of matching detecting circuit 12 attains "1". Output signal 13 is held in register 17.

Since the first bits of the bit pattern of output signal 24 of storage device 5 are "00", logic circuit 21 sets output signal 23 to "1". Output signal 23 of logic circuit 21 is ANDed with the bit pattern ("100" in this embodiment) of output signals 11 of storage device 5, and provided as output control signals 6. Further, logic circuit 21 controls output signals 9 of second pseudo random number generating circuit 8 to attain the next random number value "1011101" (ninety-third address) in response to the next clock.

Step (9)

Since the value held in register 17 is "1" at the next clock, first pseudo random number generating circuit 2 is reset, and output signals 4 attain "0000000". Data of the ninety-third address is provided as output of storage device 5.

Since the first bits of the bit pattern of output signal 24 of storage device 5 are "00", output signal 13 of matching detecting circuit 12 remains at "0" until output signals 10 of storage device 5 are matched with output signals 4 of first pseudo random number generating circuit 2. First pseudo random number generating circuit 2 sequentially outputs the next random number value in synchronism with the clock. In the meantime, output control signals 6a to 6c all remain at "0"

Step (10)

When output signals 4 of first pseudo random number generating circuit 2 attain "0000011", output signals 10 of storage device 5 are matched with output signals 4 of first pseudo random number generating circuit 2, and output signal 13 of matching detecting circuit 12 attains "1". Output signal 13 is held in register 17.

Since the first bits of the bit pattern of output signal 24 of storage device 5 are "00", logic circuit 21 sets output signal 23 to "1". Output signal 23 of logic circuit 21 is ANDed with the bit pattern ("001" in this embodiment) of output signals 11 of storage device 5, and provided as output control signals 6. Further, logic circuit 21 controls output signals 9 of second pseudo random number generating circuit 8 to attain the next random number value "0111011" (fifty-ninth address) in response to the next clock.

Step (11)

Since the value held in register 17 is "1" at the next clock, first pseudo random number generating circuit 2 is reset, and output signals 4 attain "0000000". Data of the fifty-ninth address is provided as output of storage device 5.

Since both output signals 10 of storage device 5 and output signals 4 of first pseudo random number generating circuit 2 are "0000000" at this time, output signal 13 of matching detecting circuit 12 attains "1". Output signal 13 is held in register 17.

Since the first bits of the bit pattern of output signal 24 of storage device 5 are "11", logic circuit 21 sets output signal 23 to "0". Since output signal 23 of logic circuit 21 is "0", output control signals 6a to 6c are all provided as "0".

Further, since the first bits of the bit pattern of output signal 24 of storage device 5 are "11", logic circuit 21 controls output signals 9 of second pseudo random number generating circuit 8 to attain the value "0111100" (sixtieth address) held in the register provided internally in response to the next clock.

Step (12)

Since the value held in register 17 is "1" at the next clock, first pseudo random number generating circuit 2 is reset, and output signals 4 attain "0000000". Data of the sixtieth address is provided as output of storage device 5.

Since the first bits of the bit pattern of output signal 24 of storage device 5 are "00", output signal 13 of matching detecting circuit 12 remains at "0" until output signals 10 of storage device 5 are matched with output signals 4 of first pseudo random number generating circuit 2. First pseudo random number generating circuit 2 sequentially outputs the next random number value in synchronism with the clock. In the meantime, output control signals 6a to 6c all remain at "0".

Generation of control signals is controlled hereinafter according to the content stored in storage device 5.

As described above, according to the fifth embodiment, the position of count of the pseudo random number generating circuit can be freely set according to the content of data of storage device 5. Therefore, it is possible to repeatedly generate a flow of the same control signals, or to call the flow of control signals in a subroutine manner. Since the same address space of the storage device can be used repeatedly with respect to the same control signal, the address space of the storage device can be reduced.

Figure 14:
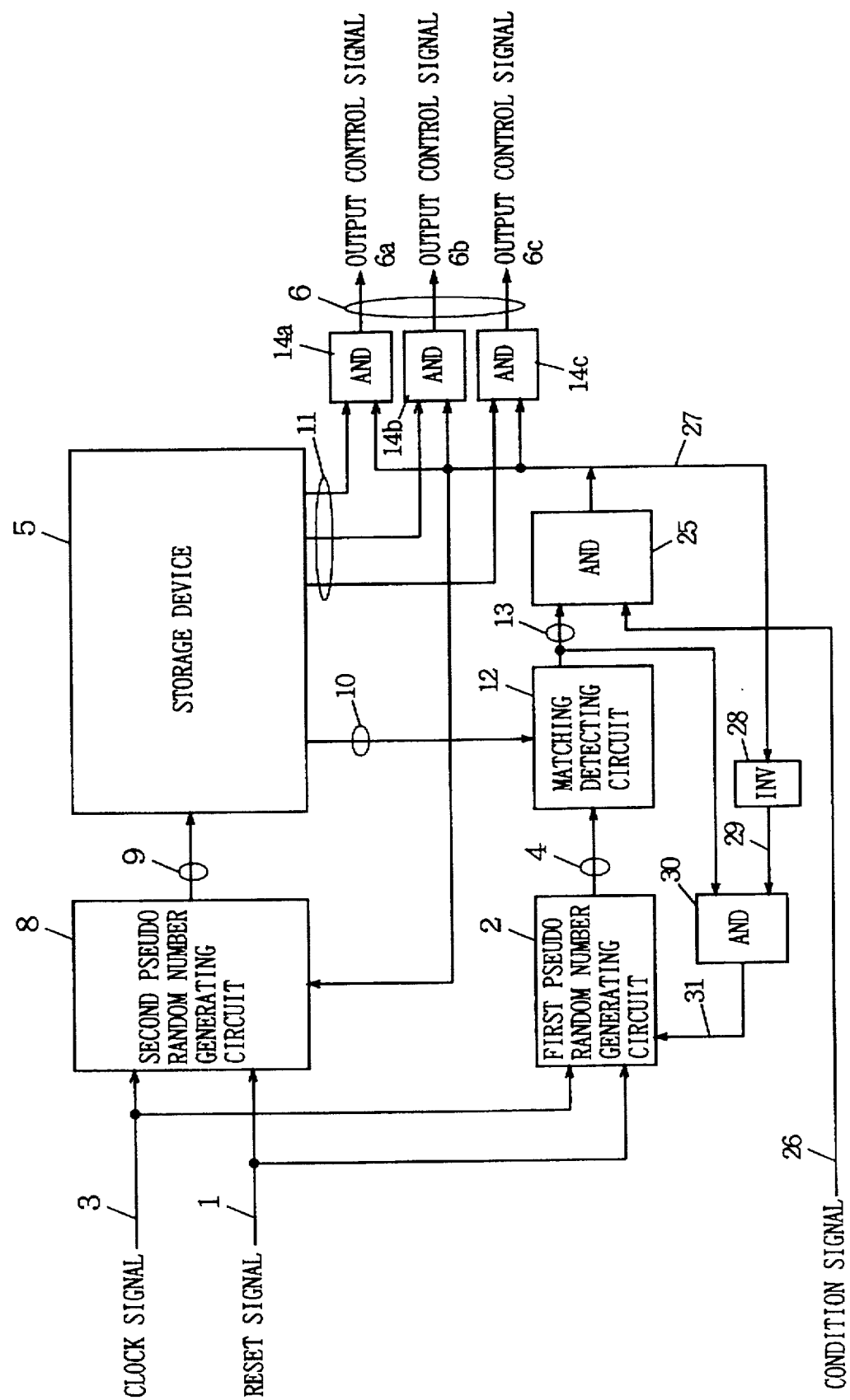
FIG. 14 is a block diagram showing the specific configuration of a control signal generating device according to a sixth embodiment of the present invention.

FIG. 14 is a block diagram showing the configuration of the control signal generating device according to the sixth embodiment of the present invention.

Referring to the figure, the difference in configuration between the first embodiment of FIG. 1 and this embodiment will be primarily described. In this embodiment, after output signal 13 of matching detecting circuit 12 is ANDed with an external condition signal 26 in an AND logic circuit 25, an output signal 27 of AND logic circuit 25 is provided as the final matching output. On the other hand, final matching detection output signal 27 is applied to AND logic circuits 14a to 14c. Simultaneously, output signal 27 is inverted by an inverter logic circuit 28, and ANDed with output signal 13 of matching detecting circuit 12 in an AND logic circuit 30, which outputs a control signal 31 to first pseudo random number generating circuit 2. First pseudo random number generating circuit 2 sequentially updates the random number value in synchronism with clock signal 3. However, only when control signal 31 is "1", first pseudo random number generating circuit 2 is controlled not to update the random number value. Therefore, when output signal 13 of matching detecting circuit 12 is "1", and final matching detection output signal 27 is "0", first pseudo random number generating circuit 2 does not update the random number value.

Other than the above points, this embodiment is similar to the first embodiment.

Figure 15:
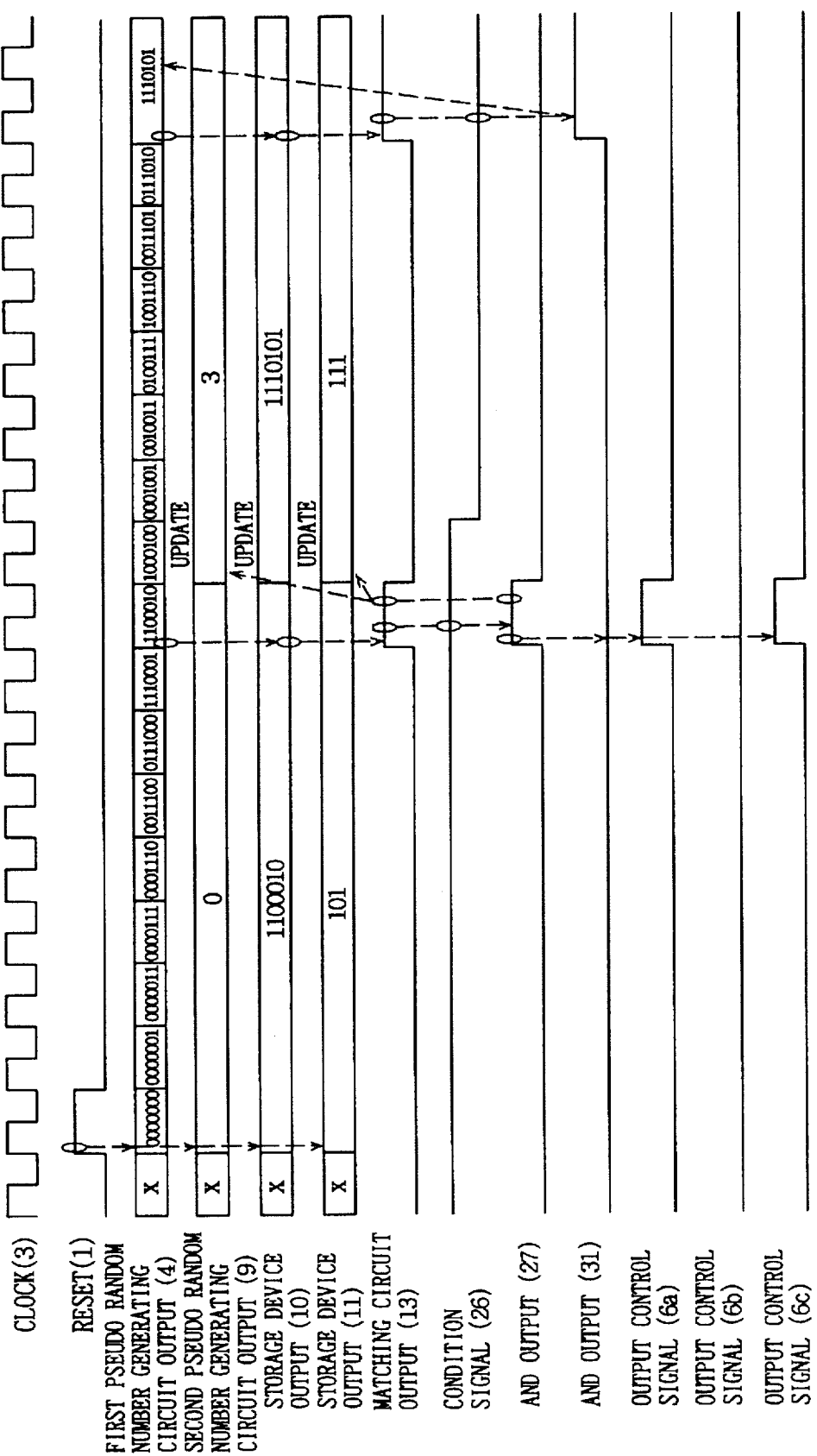
FIG. 15 is a part of a timing chart showing operation of respective portions of the control signal generating device of FIG. 14.
Figure 16:
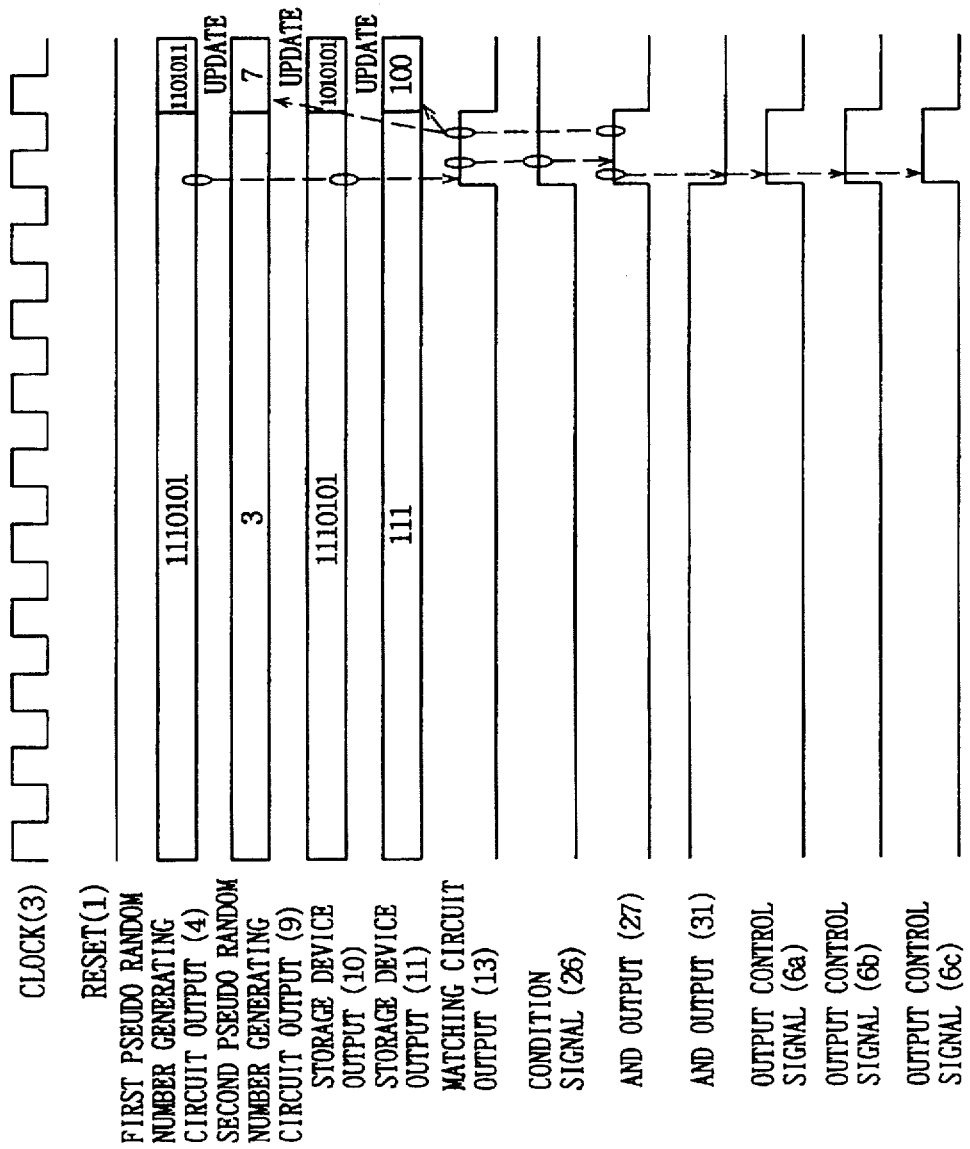
FIG. 16 is another part of the timing chart showing operation of respective portions of the control signal generating device of FIG. 14.
Figure 17:
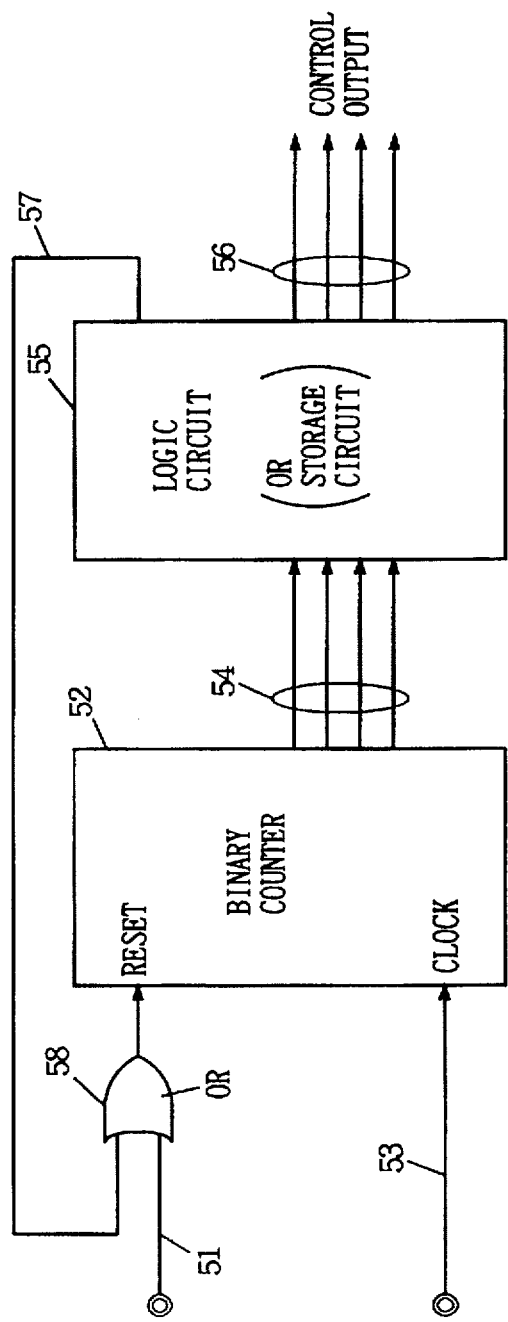
FIG. 17 is a block diagram showing the configuration of a conventional control signal generating device.
Figure 18:
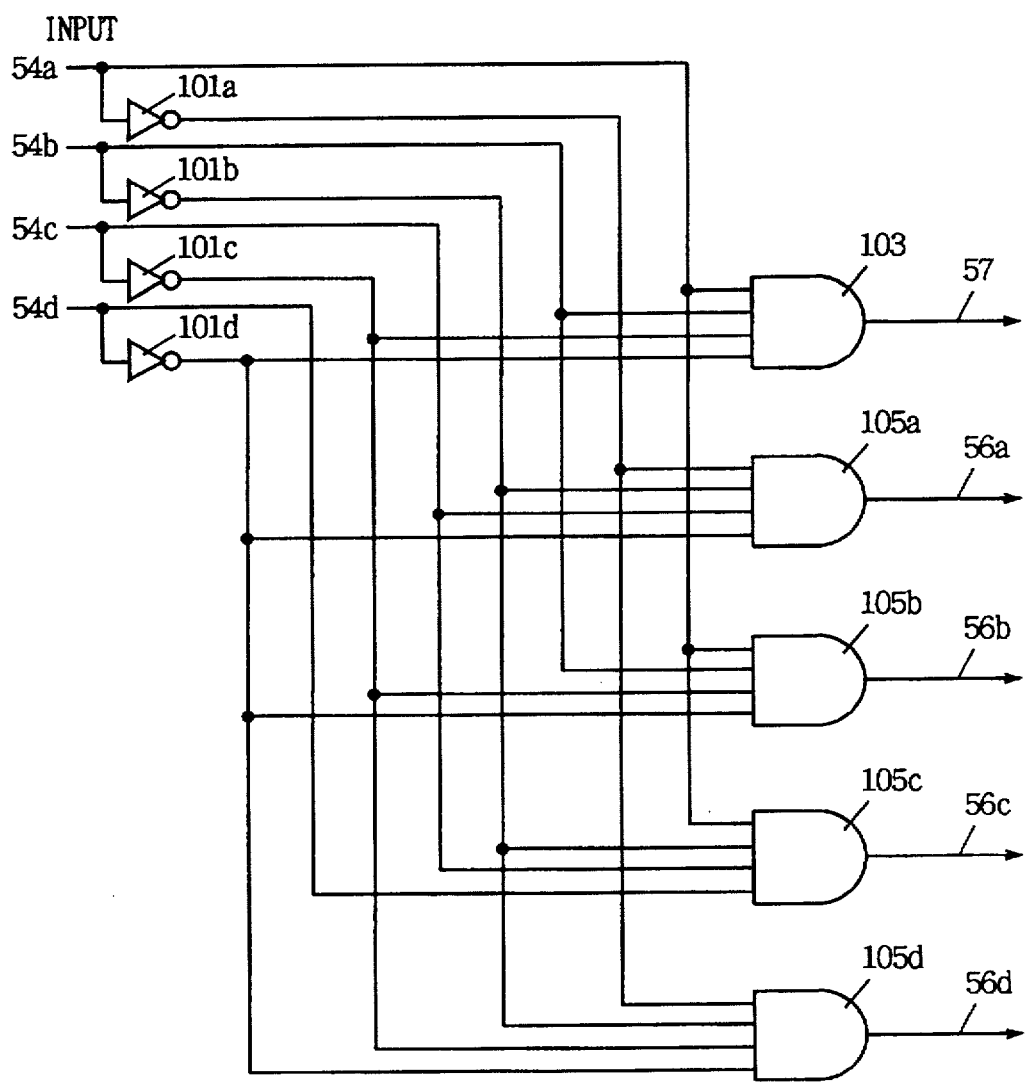
FIG. 18 is a diagram showing one example of the specific configuration of logic circuit 55 of FIG. 17.
Figure 19:
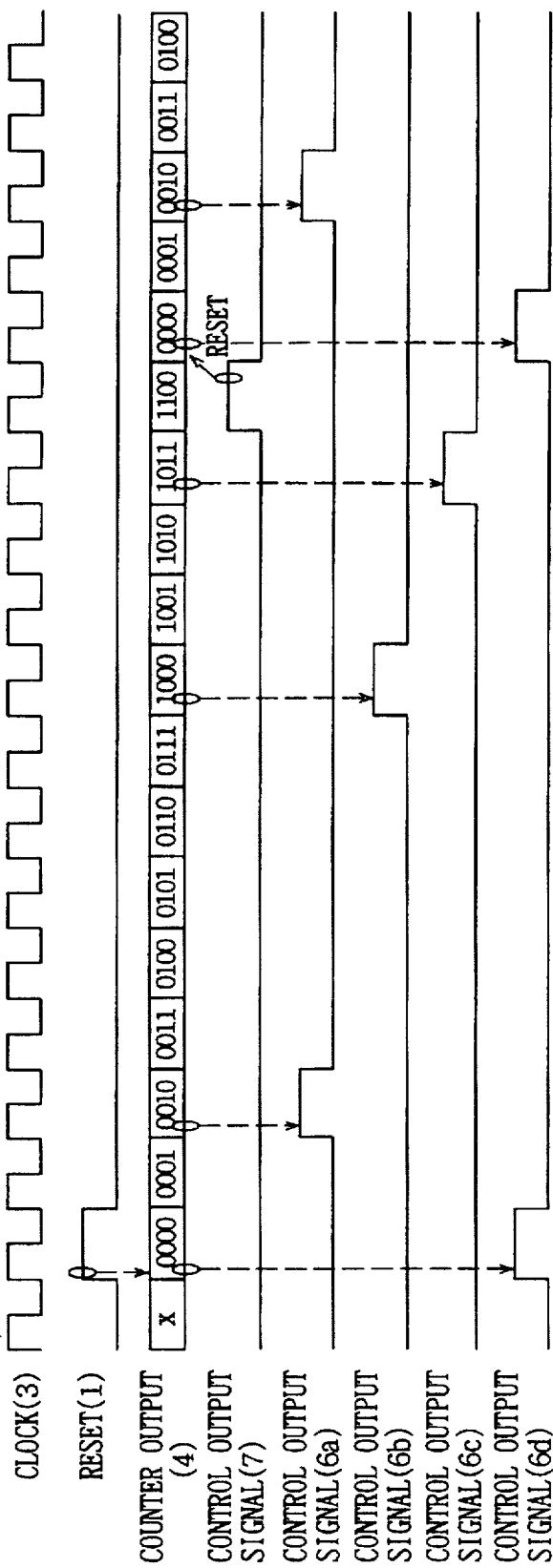
FIG. 19 is a timing chart showing operation of respective portions of the control signal generating device of FIG. 17.

FIGS. 15 and 16 together are a timing chart showing operation of respective portions of the control signal generating device of FIG. 14.

Referring to the figures, operation of the control signal generating device according to the sixth embodiment will be described.

Until output signals 10 of storage device 5 are matched with output signals 4 of first pseudo random number generating circuit 2 after reset, output control signals 6a to 6c all remain at "0", similar to the case of the first embodiment. When output signals 4 of first pseudo random number generating circuit 2 are updated, and output signals 10 of storage device 5 are matched with output signals 4 of first pseudo random number generating circuit 2, output signal 13 of matching detecting circuit 12 attains "1".

If external condition signal 26 is "1" at this time, final matching detection output signal 27 also attains "1". Similar to the case of the first embodiment, AND logic circuits 14a to 14c provide output control signals 6 of the bit pattern of output signals 11 of storage device 5, and first pseudo random number generating circuit 2 updates the random number value. Further, second pseudo random number generating circuit 8 updates the random number value in response to the next clock signal. In this case, operation similar to that of the first embodiment is carried out.

If external condition signal 26 is "0", final matching detection output signal 27 attains "0", and output control signals 6 all remain at the "0" level. In this case, an output signal 29 of inverter logic circuit 28 attains "1". Since control signal 31 of first pseudo random number generating circuit 2 attains "1", first pseudo random number generating circuit 2 stops updating the random number value. In this state, the random number value of second pseudo random number generating circuit 8 is not updated either in response to the next clock signal. Therefore, output signal 13 of matching detecting circuit 12 remains at "1". When external condition signal 26 changes from "0" to "1", final matching detection output signal 27 also attains "1". Similar to the case of the first embodiment, AND logic circuits 14a to 14c provide output control signals 6 of the bit pattern of output signals 11 of storage device 5, and first pseudo random number generating circuit 2 also updates the random number value. Further, second pseudo random number generating circuit 8 updates the random number value in response to the next clock. In this case, operation similar to that of the first embodiment is carried out.

By using this embodiment, the timings at which output control signals 6a to 6c are provided can be externally controlled. A plurality of timing control circuits can be easily synchronized, making it possible to control a complicated synchronization system.

Note that the second to the sixth embodiments are based on the first embodiment. However, by combining the features of these devices, a more complicated control signal generating device can be constructed.

In the first to the sixth embodiments, a rewritable storage device is used as storage device 5. However, an ROM (Read Only Memory), a PLA, a logic gate circuit, or the like may be used instead the rewritable storage device when rewriting is not required (in particular, when it is not necessary to change the processing sequence in a complicated manner). According to the present invention, a sequence control circuit can be fabricated as easily as the case of writing a program, given two values of a cycle count and a control bit pattern. Further, the sequence control circuit can be easily fabricated based on a timing chart. Therefore, by using the present invention, a period required for designing the sequence control circuit can be shortened.

Further, in each of the above embodiments, pseudo random numbers are generated by first pseudo random number generating circuit 2 and second pseudo random number generating circuit 8. However, by using such a pointer as shown in the conventional example, the similar sequence control may be carried out to the output of the pointer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control signal generating device, comprising:
   first numerical data generating means responsive to a clock signal for sequentially generating numerical data;
   second numerical data generating means for generating an initial value, and then, responsive to a first signal and the clock signal for sequentially generating numerical data;
   storing means in which data corresponding to every numerical data generated by said second numerical data generating means is stored;
   detecting means for detecting matching between at least a part of the corresponding data corresponding to the numerical data generated by said second numerical data generating means of the data stored in said storing means and the numerical data generated by said first numerical data generating means, to generate said first signal; and
   control signal generating means responsive to said first signal from said detecting means and at least another part of said corresponding data for generating a control signal,
   each of said first and second numerical data generating means generating pseudo random number data.

2. The control signal generating device as recited in claim 1, further comprising
   reset signal input means for inputting a reset signal to said first and second numerical data generating means,
   wherein said first numerical data generating means generates a second initial value in response to said input reset signal, and
   said second numerical data generating means generates said initial value in response to said input reset signal.

3. The control signal generating device as recited in claim 2, further comprising
   preset signal input means for inputting a preset signal to said first and second numerical data generating means,
   wherein said first numerical data generating means generates a first predetermined value in response to said input preset signal, and
   said second numerical data generating means generates a second predetermined value in response to said input preset signal.

4. The control signal generating device as recited in claim 1, wherein a numerical value generated by said second numerical data generating means includes an address value of said storing means, and said stored data includes rewritable data stored corresponding to said address value.

5. The control signal generating device as recited in claim 1, further comprising signal holding means for holding said first signal from said detecting means and, responsive to said clock signal, for outputting said held signal, wherein said first numerical data generating means generates a second initial value in response to an output of said signal holding means.

6. The control signal generating device as recited in claim 1, further comprising logic means responsive to reception of one of data output from said control signal generating means for continuously generating a first state signal, and responsive to reception of one of data output next from said control signal generating means for changing said continuously generated signal from said first state to a second state.

7. A control signal generating device, comprising:

first numerical data generating means responsive to a clock signal for sequentially generating numerical data;

second numerical data generating means for generating a first initial value and then, responsive to a first signal and the clock signal for sequentially generating numerical data;

storing means in which data corresponding to every numerical data generated by said second numerical data generating means is stored;

detecting means for detecting matching between at least one part of the corresponding data corresponding to the numerical data generated by said second numerical data generating means of said stored data and the numerical data generated by said first numerical data generating means;

signal holding means for holding a signal corresponding to a detection output of said detecting means and, responsive to said clock signal, for outputting said held signal; and signal generating means responsive to the detection output from said detecting means, said at least one part of said corresponding data and the numerical data generated by said second numerical data generating means, for generating said first signal and a second signal, and control signal generating means responsive to said second signal from said signal generating means and at least another part of said corresponding data for generating a control signal wherein said first numerical data generating means generates a second initial value in response to an output from said signal holding means.

8. The control signal generating device as recited in claim 7, wherein said control means includes data holding means for holding said at least one part of said corresponding data.

9. The control signal generating device as recited in claim 8, wherein said second numerical data generating means generates data held by said data holding means under a predetermined condition as numerical data.

10. A control signal generating device, comprising:

first numerical data generating means responsive to a clock signal for sequentially generating numerical data;

second numerical data generating means for generating an initial value and then, responsive to a first signal, for sequentially generating numerical data;

storing means in which data corresponding to every numerical data generated by said second numerical data generating means is stored;

detecting means for detecting matching between at least one part of the corresponding data corresponding to the numerical data generated by said second numerical data generating means of said stored data and the numerical data generated by said first numerical data generating means;

condition signal input means for inputting a condition signal;

signal generating means responsive to a detection output of said detecting means and said input condition signal for generating said first signal;

control signal generating means responsive to said first signal and at least one part of said corresponding data for generating a control signal; and control means responsive to the detection output of said detecting means and a state in which said condition signal is not input for controlling said first numerical data generating means not to generate a next numerical data.

11. The control signal generating device as recited in claim 10, wherein said signal generating means includes an AND logic circuit receiving the detection output of said detecting means and said input condition signal.

12. The control signal generating device as recited in claim 10, wherein said control means includes a second AND logic circuit receiving the detection output of said detecting means and an inversion of said first signal for applying its output to said first numerical data generating means.

* * * * *